(12) United States Patent
Nagami et al.

(10) Patent No.: US 10,168,507 B2
(45) Date of Patent: Jan. 1, 2019

(54) IMAGING LENS AND IMAGING APPARATUS

(71) Applicant: FUJIFILM Corporation, Tokyo (JP)

(72) Inventors: Ryosuke Nagami, Saitama (JP); Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/717,999

(22) Filed: Sep. 28, 2017

(65) Prior Publication Data

US 2018/0095246 A1     Apr. 5, 2018

(30) Foreign Application Priority Data

Oct. 4, 2016   (JP) .................................. 2016-196360

(51) Int. Cl.
   *G02B 13/00*   (2006.01)
   *G02B 9/26*   (2006.01)
   *G02B 7/09*   (2006.01)

(52) U.S. Cl.
   CPC ........... *G02B 13/0035* (2013.01); *G02B 7/09* (2013.01); *G02B 9/26* (2013.01); *G02B 13/00* (2013.01); *G02B 13/006* (2013.01); *G02B 13/0045* (2013.01)

(58) Field of Classification Search
   CPC .............................................. G02B 13/0035
   USPC ....................................................... 359/738
   See application file for complete search history.

(56) References Cited

U.S. PATENT DOCUMENTS

2015/0319389 A1*  11/2015  Huang ................... H04N 5/374
                                                           348/311

FOREIGN PATENT DOCUMENTS

| JP | 2012-242690 A | 12/2012 |
| JP | 2013-003324 A | 1/2013 |
| JP | 2013-088718 A | 5/2013 |
| JP | 2013-238740 A | 11/2013 |
| JP | 2016-109759 A | 6/2016 |

* cited by examiner

*Primary Examiner* — James Jones
(74) *Attorney, Agent, or Firm* — Studebaker & Brackett PC (57) ABSTRACT

The imaging lens consists of, in order from the object side, a first lens group having a positive refractive power, a second lens group having a negative refractive power, and a third lens group having a positive refractive power. The first lens group has a positive lens, a positive lens, and a negative lens successively in order from a position closest to the object side. The second lens group consists of one negative lens. The third lens group includes two or less lenses. During focusing, only the second lens group moves. The following conditional expression, which relates to a focal length f of the whole system in a state where the object at infinity is in focus and a focal length f2 of the second lens group, is satisfied: $0.4<|f/f2|<1.3$.

20 Claims, 7 Drawing Sheets

EXAMPLE 1

FIG. 1
EXAMPLE 1

FIG. 2
EXAMPLE 2

FIG. 6
EXAMPLE 2

FIG. 7
EXAMPLE 3

IMAGING LENS AND IMAGING APPARATUS

CROSS-REFERENCE TO RELATED APPLICATIONS

The present application claims priority under 35 U.S.C. § 119 to Japanese Patent Application No. 2016-196360, filed on Oct. 4, 2016. The above application is hereby expressly incorporated by reference, in its entirety, into the present application.

BACKGROUND OF THE INVENTION

1. Field of the Invention

The present invention relates to an imaging lens, which is appropriate for a digital camera, a video camera, and the like, and an imaging apparatus which comprises the imaging lens.

2. Description of the Related Art

In the related art, an inner focus type imaging lens is used as an imaging lens mounted on an imaging apparatus such as a digital camera. In such an imaging lens, it is strongly demanded that focusing can be performed at high speed and the shortest imaging distance is as short as possible. In the imaging lens, in a case where a lens group (hereinafter referred to as a focus lens group) that moves during focusing is formed of only one lens, it is possible to reduce the size and weight of the focus lens group, and thus high-speed focusing becomes possible. For example, JP2013-238740A, JP2013-088718A, JP2012-242690A, JP2013-003324A, and JP2016-109759A disclose inner focus type imaging lenses in which the focus lens group is formed of one lens.

SUMMARY OF THE INVENTION

In the inner focus type imaging lenses described in JP2013-238740A, JP2013-088718A, and JP2012-242690A in which the focus lens group is formed of one lens, in order to minimize an amount of movement of the focus lens group during focusing, a refractive power of the focus lens group is set to be strong. Due to this, it is difficult to sufficiently correct aberrations throughout the entire range of the object distance, and aberration fluctuation caused by the object distance becomes large. In a case where the shortest imaging distance is short, the amount of movement of the focus lens group further increases, and thus it is more difficult to suppress aberration fluctuation caused by the object distance. In the inner focus type imaging lens described in JP2013-238740A in which the focus lens group is formed of one lens and the refractive power of the focus lens group is not so strong, the first lens group is formed of a positive lens, a negative lens, and a positive lens in order from the object side. However, there is room for improvement in correction of chromatic aberration.

In the imaging lens described in JP2013-003324A in which the aperture stop is located between the first lens group and the second lens group and the second lens group and the third lens group have a simple configuration, it is difficult to correct lateral chromatic aberration and the like, and it is also difficult for this type of lens system to maintain high optical performance throughout the entire object distance. In the imaging lens described in JP2016-109759A, the third lens group is formed of three lenses, and the convex surfaces are set to face each other with the air gap interposed therebetween. Thus, it is preferable to further reduce the size of the imaging lens.

The present invention has been made in view of the above situations, and an object of the present invention is to provide an inner focus type imaging lens which has a small size, is capable of high-speed focusing, has less aberration fluctuation caused by the object distance, and has high optical performance throughout the entire object distance, and an imaging apparatus comprising the imaging lens.

According to the present invention, there is provided an imaging lens consisting of, in order from an object side: a first lens group that has a positive refractive power; a second lens group that consists of a negative refractive power; and a third lens group that has a positive refractive power, in which the first lens group has a positive lens, a positive lens, and a negative lens, successively in order from a position closest to the object side, in which the second lens group includes one negative lens, in which the number of lenses of the third lens group is equal to or less than two, in which during focusing, only the second lens group moves in the optical axis direction, and in which Conditional Expression (1) is satisfied.

$$0.4 < |f/f2| < 1.3 \tag{1}$$

Here, f is a focal length of the whole system in a state where an object at infinity is in focus, and f2 is a focal length of the second lens group.

It is preferable that the imaging lens of the present invention satisfies Conditional Expression (1-1).

$$0.5 < |f/f2| < 1.25 \tag{1-1}$$

Here, f is a focal length of the whole system in a state where an object at infinity is in focus, and f2 is a focal length of the second lens group.

It is preferable that the imaging lens of the present invention satisfies Conditional Expression (2), and it is more preferable that the imaging lens satisfies Conditional Expression (2-1).

$$0.4 < |(1-\beta2^2) \times \beta3^2| < 1.8 \tag{2}$$

$$0.7 < |(1-\beta2^2) \times \beta3^2| < 1.5 \tag{2-1}$$

Here, β2 is a paraxial lateral magnification of the second lens group in a state where the object at infinity is in focus, and β3 is a paraxial lateral magnification of the third lens group in a state where the object at infinity is in focus.

In the imaging lens of the present invention, it is preferable that the first lens group consists of, in order from the object side, a front group having a positive or negative refractive power, an aperture stop, and a rear group having a positive refractive power. In this case, it is preferable that a surface closest to the image side in the front group is a concave surface. Further, it is preferable that the rear group has at least one negative lens. It is preferable that the rear group has a cemented lens formed by one negative lens and one positive lens that are cemented together.

In a case where the rear group has the cemented lens having the above-mentioned configuration, it is preferable that a surface closest to the object side in the cemented lens closest to the image side within the rear group is a concave surface. Further, in the case where the rear group has the cemented lens having the above-mentioned configuration, it is preferable that the cemented lens closest to an image side in the rear group satisfies Conditional Expression (3).

$$5 < vG1bp - vG1bn < 70 \tag{3}$$

Here, vG1bp is an Abbe number of a positive lens of the cemented lens closest to the image side in the rear group at a d line, and vG1bn is an Abbe number of a negative lens of the cemented lens closest to the image side in the rear group at the d line.

Further, it is preferable that the rear group satisfies Conditional Expression (5), and it is more preferable that the rear group satisfies Conditional Expression (5-1).

$$1 < f/f1b < 2 \tag{5}$$

$$1.4 < f/f1b < 1.9 \tag{5-1}$$

Here, f is a focal length of the whole system in a state where an object at infinity is in focus, and f1b is a focal length of the rear group.

It is preferable that the imaging lens of the present invention satisfies Conditional Expression (4).

$$50 < vG2 < 75 \tag{4}$$

Here, vG2 is an Abbe number of the negative lens of the second lens group at the d line.

In the imaging lens of the present invention, it is preferable that an image side surface of the second lens from the object side of the first lens group is a concave surface.

In the imaging lens of the present invention, it is preferable that an image side surface of the negative lens of the second lens group is a concave surface.

It is preferable that the imaging lens of the present invention satisfies Conditional Expression (6).

$$0.1 < f/f3 < 2 \tag{6}$$

Here, f is a focal length of the whole system in a state where an object at infinity is in focus, and f3 is a focal length of the third lens group.

In the imaging lens of the present invention, it is preferable that the third lens group consists of a cemented lens formed by one negative lens and one positive lens that are cemented together in order from the object side. In this case, it is preferable that the imaging lens satisfies Conditional Expression (7).

$$-10 < vG3p - vG3n < 50 \tag{7}$$

Here, vG3p is an Abbe number of the positive lens of the cemented lenses of the third lens group at the d line, and vG3n is an Abbe number of the negative lens of the cemented lenses of the third lens group at the d line.

In the imaging lens of the present invention, it is preferable that a surface closest to the image side in the third lens group is a convex surface.

An imaging apparatus of the present invention comprises the imaging lens of the present invention.

It should be noted that the terms "comprises ~" and "includes ~" mean "includes substantially". Specifically, the imaging lens may include not only the above-mentioned elements but also lenses substantially having no powers, optical elements, which are not lenses, such as a stop and a cover glass, and mechanism parts such as a lens flange, a lens barrel, an imaging element, and a hand shaking correction mechanism.

In addition, the term "~ group that has a positive refractive power" means that the group has a positive refractive power as a whole. It is the same for the term "~ group that has a negative refractive power". Reference signs of refractive powers of the groups and reference signs of refractive powers of the lenses are assumed as those in paraxial regions in a case where some lenses have aspheric surfaces. The "group" is not necessarily formed of a plurality of lenses, but may be formed as only one lens.

In addition, the number of lenses mentioned above is the number of lenses formed as the elements. For example, the number of lenses of the cemented lens, in which a plurality of single lenses having different materials is cemented, indicates the number of single lenses constituting the cemented lens. However, a compound aspheric lens (a lens in which a spherical lens and a film of an aspheric surface shape formed on the spherical lens are formed integrally and which functions as one aspheric lens as a whole) is not considered as a cemented lens, and is treated as one lens. Further, all the conditional expressions are based on the d line (a wavelength of 587.56 nm).

According to the present invention, the lens system includes, in order from the object side, a first lens group having a positive refractive power, a second lens group having a negative refractive power, and a third lens group having a positive refractive power, where only the second lens group moves during focusing. In the lens system, a configuration of each lens group is appropriately set, such that predetermined conditional expressions are further satisfied. Thus, it is possible to provide an inner focus type imaging lens which has a small size, is capable of high-speed focusing, has less aberration fluctuation caused by the object distance, and has high optical performance throughout the entire object distance, and an imaging apparatus comprising the imaging lens.

DESCRIPTION OF THE PREFERRED EMBODIMENTS

Hereinafter, embodiments of the present invention will be described with reference to drawings. FIGS. 1 to 4 are cross-sectional views illustrating configurations and optical paths of imaging lenses according to an embodiment of the present invention, and respectively correspond to Examples 1 to 4 to be described later. FIGS. 1 to 4 show situations where an object at infinity is in focus, where the left side thereof is the object side and the right side thereof is the image side, where regarding the optical paths, on-axis rays 2 and off-axis rays 3 with the maximum angle of view are shown. Basic configurations and illustration methods of examples shown in FIGS. 1 to 4 are the same, and will be hereinafter described with reference to mainly the example shown in FIG. 1.

This imaging lens consists of, in order from the object side to the image side along an optical axis Z: a first lens group G1 that has a positive refractive power as a whole; a second lens group G2 that has a negative refractive power as a whole; and a third lens group G3 that has a positive refractive power as a whole. In the example shown in FIG. 1, the first lens group G1 includes, in order from the object side, six lenses, that is, lenses L11 to L16, the second lens group G2 consists of only one lens, that is, a lens L21, and the third lens group G3 consists of, in order from the object side, two lenses, that is, lenses L31 and L32. However, in the present invention, the first lens group G1 and the third lens group G3 can also be formed of a different number of lenses from the example of FIG. 1.

Figure 1:
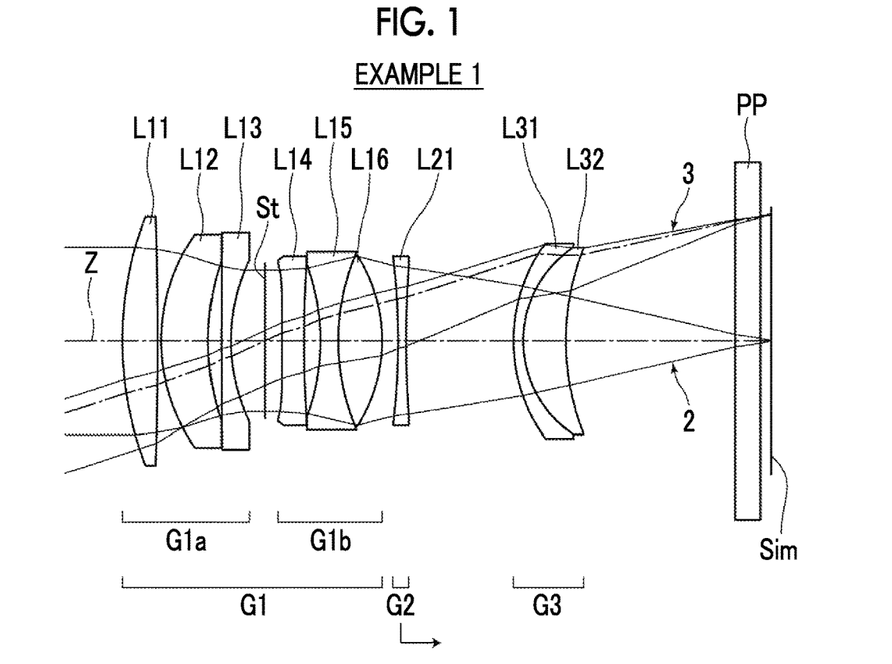
FIG. 1 is a cross-sectional view illustrating a configuration and an optical path of an imaging lens of Example 1 of the present invention.

In addition, FIG. 1 shows an example in which an optical member PP having a plane parallel plate shape is disposed between the lens system and the image plane Sim. The optical member PP is assumed to be an infrared cut filter, a low pass filter, various other filters, a cover glass, and/or the like. In the present invention, the optical member PP may be disposed at a position different from that in the example of FIG. 1, or the optical member PP may be omitted.

In this imaging lens, during focusing, the first lens group G1 and the third lens group G3 are fixed with respect to the image plane Sim, and only the second lens group G2 moves in the optical axis direction. In the example of FIG. 1, during focusing from the object at infinity to a close-range object, only the second lens group G2 is configured to move from the object side to the image side. The arrow below the second lens group G2 in FIG. 1 indicates a direction in which the second lens group G2 moves during focusing from the object at infinity to the close-range object.

By forming the first lens group G1 as a lens group having a positive refractive power, it is possible to reduce an outer diameter of the lens of the second lens group G2. Further, by forming the second lens group G2 as a lens group having negative refractive power and forming the third lens group G3 as a lens group having positive refractive power, it is possible to increase an imaging magnification of the second lens group G2, and it is possible to reduce an amount of movement of the second lens group G2 during focusing.

The second lens group G2 is configured to be formed of only one negative lens. By adopting the configuration in which the second lens group G2 as the focus lens group is formed of one lens, it is possible to reduce the size and weight of the focus unit, and this configuration is capable of contributing to high-speed auto focusing.

It is preferable that an image side surface of the negative lens of the second lens group G2 is a concave surface. In such a case, it is possible to increase the height of the off-axis rays between the second lens group G2 and the third lens group G3, and thus it is possible to decrease an incident angle of the off-axis principal rays onto the image plane Sim. In general, the image plane Sim is a plane on which the imaging element is disposed when the imaging lens is mounted on the imaging apparatus. Therefore, according to the above-mentioned configuration, it is possible to effectively secure an amount of light.

The first lens group G1 is configured to have a positive lens, a positive lens, and a negative lens successively in order from a position closest to the object side. By arranging two positive lenses successively from the position closest to the object side, it is possible to shorten the back focal length while reducing outer diameters of the two lenses arranged on the image side. As a result, there is an advantage in shortening the total length of the lens system. Furthermore, a negative lens is arranged on the image side successively from the two positive lenses which are arranged in order from the position closest to the object side, and thus there is an advantage in correction of spherical aberration and chromatic aberration.

It is preferable that the image side surface of the second lens from the object side of the first lens group G1 is a concave surface. In such a case, this configuration is advantageous in correction of astigmatism and lateral chromatic aberration.

It is preferable to adopt a configuration in which the first lens group G1 consists of, in order from the object side, a front group G1a having a positive or negative refractive power, an aperture stop St, and a rear group G1b having a positive refractive power. The configuration, in which the first lens group G1 includes the aperture stop St, is advantageous in reducing the diameter of the lens closest to the object side. By arranging the rear group G1b having a positive refractive power on the image side of the aperture stop St, the rear group G1b and the second lens group G2 having a negative refractive power are moved in cooperation, such that distortion and lateral chromatic aberration are easily balanced. Further, by arranging the front group G1a such that the lens group is closer to the object side than the aperture stop St, the front group G1a and the rear group G1b closer to the image side than the aperture stop St are moved in cooperation, such that the distortion and the lateral chromatic aberration are balanced. Therefore, the load of correction for the residual aberration of the first lens group G1 carried by the second lens group G2 can be reduced, the second lens group G2 can be formed of a smaller number of lenses. As a result, it is possible to reduce the weight of the focus lens group. Furthermore, the aperture stop St is set to be close to the lens closest to the object side. Thus, the diameter of the lens closest to the object side decreases. As a result, there is an advantage in reduction in size.

In the example of FIG. 1, the front group G1a consists of three lenses L11 to L13, the rear group G1b consists of three lenses L14 to L16, and the aperture stop St is disposed between the lens L13 and the lens L14. It should be noted that the aperture stop St shown in FIG. 1 does not necessarily indicate its sizes and/or shapes, and indicates a position of the aperture stop St on the optical axis Z.

As described above, in a case where the first lens group G1 is configured to consists of three lenses, the aperture stop St, and three lenses in order from the object side, the number of lenses on the object side is set to be the same as the number of lenses on the image side with the aperture stop St interposed therebetween. Thus, it is easy to make a symmetrical configuration, and various aberrations are easily canceled. As a result, there is an advantage in achieving high optical performance. If the first lens group G1 has the aperture stop St disposed therein, three lenses are formed on one of the object side and the image side of the aperture stop St, and two or less lenses are formed on the other side, as compared with the case where three lenses are disposed on each of the object side and the image side of the aperture stop St, it becomes difficult to correct distortion and lateral chromatic aberration.

It is preferable that a surface closest to the image side in the front group G1a is a concave surface. In such a case, this configuration is advantageous in correction of spherical aberration and astigmatism. Further, by favorably correcting aberrations in the first lens group G1, the load of aberration correction carried by each of the second lens group G2 and the third lens group G3 is reduced, and a configuration using a small number of lenses becomes possible. As a result, this is also advantageous in shortening the total length of the lens system.

It is preferable that the rear group G1b has at least one negative lens. In such a case, it is possible to satisfactorily correct chromatic aberration in the first lens group G1, and thus there is an advantage in correction of chromatic aberration.

It is preferable that the rear group G1b has a cemented lens formed by one negative lens and one positive lens that are cemented together. In such a case, it is possible to satisfactorily correct chromatic aberration in the first lens group G1. In this imaging lens, focusing is performed by moving only the second lens group G2 formed of one lens. Therefore, it is important that chromatic aberration is suppressed within the first lens group G1.

In a case where the rear group G1b has the cemented lens having the above-mentioned configuration, it is preferable that a surface closest to the object side in the cemented lens closest to the image side within the rear group G1b having the above-mentioned configuration is a concave surface. In such a case, this configuration is advantageous in correction of spherical aberration and astigmatism. Further, by favorably correcting aberrations in the first lens group G1, the load of aberration correction carried by each of the second lens group G2 and the third lens group G3 is reduced, and a configuration using a small number of lenses becomes possible. As a result, this is also advantageous in shortening the total length of the lens system.

The number of lenses of the third lens group G3 is configured to be equal to or less than two. Thereby, it is possible to secure the back focal length while securing a moving space of the second lens group G2 which is the focus lens group. Further, this configuration is also advantageous in reduction in size of the lens system.

It is preferable that the third lens group G3 consists of a cemented lens formed by one negative lens and one positive lens that are cemented together in order from the object side. In such a case, this configuration is advantageous in correction of lateral chromatic aberration and field curvature. In this case, since the lens closest to the object side in the third lens group G3 is a negative lens, it is possible to reduce the load of aberration correction through the negative lens of the second lens group G2 that moves during focusing, and there is an advantage in suppression of aberration fluctuation during focusing. As a result, it becomes easy to achieve high optical performance throughout the entire object distance.

The surface closest to the image side of the third lens group G3 may be configured to be a convex surface. In such a case, this configuration is advantageous in suppression of the incident angle of the off-axis principal rays onto the image plane Sim, and it is possible to efficiently secure an amount of light to the peripheral portion of the imaging area.

The imaging lens is configured to satisfy Conditional Expression (1).

$$0.4<|f/f2|<1.3 \tag{1}$$

Here, f is a focal length of the whole system in a state where an object at infinity is in focus, and f2 is a focal length of the second lens group G2.

By satisfying Conditional Expression (1), the refractive power of the second lens group G2 can be set in an appropriate range. As a result, there is an advantage in reduction in size and suppression of aberration variation caused by focusing. By not allowing the result of Conditional Expression (1) to be equal to or less than the lower limit, the refractive power of the second lens group G2 is prevented from becoming excessively weak, and thus it is possible to minimize the amount of movement of the second lens group G2 during focusing. As a result, there is an advantage in shortening the total length of the lens system. By not allowing the result of Conditional Expression (1) to be equal to or greater than the upper limit, the refractive power of the second lens group G2 is prevented from becoming excessively strong, and thus it is possible to reduce aberration fluctuation caused by the object distance. As a result, it becomes easy to maintain performance throughout the entire object distance. Hence, it is possible to minimize the number of lenses necessary for aberration correction. As a result, there is an advantage in reduction in size.

In order to enhance the effect relating to Conditional Expression (1), it is preferable that Conditional Expression (1-1) is satisfied.

$$0.5<|f/f2|<1.25 \tag{1-1}$$

It is preferable that the imaging lens satisfies Conditional Expression (2).

$$0.4<|(1-\beta 2^2)\times \beta 3^2|<1.8 \tag{2}$$

Here, β2 is a paraxial lateral magnification of the second lens group G2 in a state where the object at infinity is in focus, and β3 is a paraxial lateral magnification of the third lens group G3 in a state where the object at infinity is in focus.

Conditional Expression (2) is an expression relating to the amount of movement of the focus position with respect to the amount of movement of the focus lens group, that is, the expression defines the sensitivity of the focus. By not allowing the result of Conditional Expression (2) to be equal to or less than the lower limit, it is possible to minimize the amount of movement of the second lens group G2 during focusing. As a result, there is an advantage in reduction in size of the entire lens system and reduction in the shortest imaging distance. By not allowing the result of Conditional Expression (2) to be equal to or greater than the upper limit, the refractive power of the second lens group G2 is prevented from becoming excessively strong, and thus it becomes easy to suppress fluctuation in various aberrations, in particular, fluctuation in field curvature, during focusing.

In order to enhance the effect relating to Conditional Expression (2), it is preferable that Conditional Expression (2-1) is satisfied.

$$0.7<|(1-\beta ^2)\times \beta 3^2|<1.5 \tag{2-1}$$

In a case where the first lens group G1 has the rear group G1b and the rear group G1b has a cemented lens formed by one negative lens and one positive lens that are cemented together, it is preferable that the cemented lens closest to the image side in the rear group G1b having the above-mentioned configuration satisfies Conditional Expression (3).

$$5<vG1bp-vG1bn<70 \tag{3}$$

Here, vG1bp is an Abbe number of a positive lens of the cemented lens closest to the image side in the rear group G1b at a d line, and vG1bn is an Abbe number of a negative lens of the cemented lens closest to the image side in the rear group G1b at the d line.

By not allowing the result of Conditional Expression (3) to be equal to or less than the lower limit, it is possible to prevent lateral chromatic aberration and longitudinal chromatic aberration in the first lens group G1 from being insufficiently corrected. As a result, there is an advantage in achieving high optical performance. By not allowing the result of Conditional Expression (3) to be equal to or greater than the upper limit, it is possible to prevent lateral chromatic aberration and longitudinal chromatic aberration in the first lens group G1 from being excessively corrected. As a result, there is an advantage in achieving high optical performance.

In order to enhance the effect relating to Conditional Expression (3), it is preferable that Conditional Expression (3-1) is satisfied.

$$5<vG1bp-vG1bn<20 \qquad (3\text{-}1)$$

It is preferable that the imaging lens satisfies Conditional Expression (4).

$$50<vG2<75 \qquad (4)$$

Here, vG2 is an Abbe number of the negative lens of the second lens group G2 at the d line.

By not allowing the result of Conditional Expression (4) to be equal to or less than the lower limit, it is possible to suppress fluctuation of chromatic aberration caused by focusing. As a result, there is an advantage in maintaining high optical performance throughout the entire object distance. By not allowing the result of Conditional Expression (4) to be equal to or greater than the upper limit, it becomes easy to correct lateral chromatic aberration occurring in the first lens group G1.

It is preferable that the imaging lens satisfies Conditional Expression (5).

$$1<f/f1b<2 \qquad (5)$$

Here, f is a focal length of the whole system in a state where an object at infinity is in focus, and f1b is a focal length of the rear group G1b.

By maintaining the refractive power of the rear group G1b located immediately before the object side of the second lens group G2 such that the lens group satisfies Conditional Expression (5), it becomes easy to set the refractive power of the second lens group G2 in an appropriate range by balancing the refractive powers of the respective lens groups, and it becomes easy to suppress aberration fluctuation caused by the object distance while reducing the size thereof. By not allowing the result of Conditional Expression (5) to be equal to or less than the lower limit, the negative refractive power of the second lens group G2 is prevented from becoming excessively weak, and thus it is possible to minimize the amount of movement of the second lens group G2 during focusing according to the variation of the object distance. As a result, there are advantages in high-speed auto focusing and in shortening of the total length of the lens system. By not allowing the result of Conditional Expression (5) to be equal to or greater than the upper limit, the negative refractive power of the second lens group G2 is prevented from becoming excessively strong. As a result, there is an advantage in suppressing aberration fluctuation caused by the object distance.

In order to enhance the effect relating to Conditional Expression (5), it is preferable that Conditional Expression (5-1) is satisfied.

$$1.4<f/f1b<1.9 \qquad (5\text{-}1)$$

It is preferable that the imaging lens satisfies Conditional Expression (6).

$$0.1<f/f3<2 \qquad (6)$$

Here, f is a focal length of the whole system in a state where an object at infinity is in focus, and f3 is a focal length of the third lens group G3.

By making the refractive power of the third lens group G3 strong such that the lens group satisfies Conditional Expression (6), it is possible to increase the magnification of the second lens group G2. As a result, there is an advantage in reduction in amount of movement of the second lens group G2 during focusing. This is able to contribute to the realization of high-speed auto focusing, and also leads to shortening of the total length of the lens system. By not allowing the result of Conditional Expression (6) to be equal to or less than the lower limit, it is possible to minimize the amount of movement of the second lens group G2 during focusing. As a result, there are advantages in high-speed auto focusing and in shortening of the total length of the lens system. By not allowing the result of Conditional Expression (6) to be equal to or greater than the upper limit, it is possible to minimize the amounts of occurrence of spherical aberration and field curvature in the third lens group G3.

In order to enhance the effect relating to Conditional Expression (6), it is preferable that Conditional Expression (6-1) is satisfied.

$$0.1<f/f3<1.5 \qquad (6\text{-}1)$$

In a case where the third lens group G3 is configured to consists of a cemented lens formed by one negative lens and one positive lens that are cemented together in order from the object side, it is preferable that Conditional Expression (7) is satisfied.

$$-10<vG3p-vG3n<50 \qquad (7)$$

Here, vG3p is an Abbe number of the positive lens of the cemented lenses of the third lens group G3 at the d line, and vG3n is an Abbe number of the negative lens of the cemented lenses of the third lens group G3 at the d line.

By not allowing the result of Conditional Expression (7) to be equal to or less than the lower limit, it becomes easy to correct lateral chromatic aberration. By not allowing the result of Conditional Expression (7) to be equal to or greater than the upper limit, it is possible to satisfactorily correct chromatic aberration by preventing chromatic aberration from being excessively corrected. By satisfying Conditional Expression (7), it becomes easy to correct chromatic aberration, in particular, lateral chromatic aberration without increasing the number of lenses of the third lens group G3 for correction. If the number of lenses increases, the configuration becomes complicated, and this also makes it difficult to shorten the total length of the lens system.

In order to enhance the effect relating to Conditional Expression (7), it is preferable that Conditional Expression (7-1) is satisfied.

$$-10<vG3p-vG3n<30 \qquad (7\text{-}1)$$

Each of the lens groups can be configured as follows, for example. The front group G1a is configured to include, in order from the object side, a positive lens having a surface convex toward the object side, a positive meniscus lens having a surface convex toward the object side, and a negative lens having a surface concave toward the image side. All the lenses of the front group G1a may be single lenses which are not cemented. The rear group G1b can be configured to consist of, in order from the object side, one single lens and a cemented lens formed by a biconcave lens and a biconvex lens that are cemented together in order from the object side. The second lens group G2 may be configured to include a negative lens having a surface concave toward the image side. The third lens group G3 can be configured to consist of a cemented lens formed by a negative lens and a positive lens that are cemented together in order from the object side and of which the cemented surface is convex toward the object side.

It should be noted that the above-mentioned preferred configurations and available configurations may be arbitrary combinations, and it is preferable to selectively adopt the configurations in accordance with required specification.

Next, numerical examples of the imaging lens of the present invention will be described.

EXAMPLE 1

A lens configuration of an imaging lens of Example 1 is shown in FIG. 1, and an illustration method and a configuration thereof are as described above. Therefore, repeated description is omitted herein. The imaging lens of Example 1 includes, in order from the object side: a first lens group G1 that has a positive refractive power; a second lens group G2 that has a negative refractive power; and a third lens group G3 that has a positive refractive power. The first lens group G1 includes, in order from the object side, a front group G1a having a positive refractive power, an aperture stop St, and a rear group G1b having a positive refractive power. During focusing from the object at infinity to the close-range object, only the second lens group G2 moves from the object side to the image side.

The front group G1a includes three lenses L11 to L13, the rear group G1b includes three lenses L14 to L16, and the aperture stop St is disposed between the lens L13 and the lens L14. The second lens group G2 is formed of only one lens of the lens L21 and the third lens group G3 includes two lenses L31 and L32 in order from the object side. The lens L15 and the lens L16 are cemented to each other. The lens L31 and the lens L32 are cemented to each other. The other lenses are single lenses which are not cemented.

Table 1 shows basic lens data of the imaging lens of Example 1, Table 2 shows specification and variable surface spacings, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the image side when an object side surface of an element closest to the object side is regarded as a first surface. The column of Ri shows a radius of curvature of the i-th surface. The column of Di shows a surface spacing on the optical axis Z between the i-th surface and an i+1 surface. In Table 1, the column of Ndj shows a refractive index of a j-th (j=1, 2, 3, . . . ) element at the d line (a wavelength of 587.6 nm), where j sequentially increases toward the image side when the surface of the element closest to the object side is regarded as the first surface. The column of vdj shows an Abbe number of the j-th element on the basis of the d line.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of Di indicates a spacing between the image plane Sim and the surface closest to the image side in the table. In Table 1, the variable surface spacings, which are variable during focusing, are referenced by the reference signs DD[ ], and are written into places of Di, where object side surface numbers of spacings are noted in [ ].

Table 2 shows values of the focal length f' of the whole system, the F number FNo., the maximum total angle of view 2ω, and the variable surface spacing during focusing, on the basis of the d line. In Table 2, the column denoted by the "infinity" shows respective values thereof in a state where the object at infinity is in focus, and the column denoted by "1 m" shows respective values thereof in a state where an object at an object distance of 1 m is in focus.

In Table 1, the reference sign* is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E±n" (n: an integer) in numerical values of the aspheric coefficients of Table 3 indicates "×10$^{\pm n}$". The aspheric coefficients are values of the coefficients KA and Am (m=3, 4, 5, . . . 20) in aspheric surface expression represented as the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

| | | Example 1 | | |
|---|---|---|---|---|
| Si | Ri | Di | Ndj | vdj |
| 1 | 38.462 | 4.00 | 1.61772 | 49.8 |
| 2 | −438.666 | 0.40 | | |
| 3 | 20.833 | 5.26 | 1.62588 | 35.7 |
| 4 | 27.831 | 1.50 | | |
| 5 | 1331.487 | 1.05 | 1.78472 | 25.7 |
| 6 | 20.700 | 3.87 | | |
| 7(St) | ∞ | 1.91 | | |
| *8 | ∞ | 2.50 | 1.51633 | 64.1 |
| *9 | 383.597 | 1.83 | | |
| 10 | −24.569 | 2.01 | 1.74077 | 27.8 |
| 11 | 25.063 | 4.97 | 1.90525 | 35.0 |
| 12 | −17.766 | DD[12] | | |
| 13 | −78.343 | 0.90 | 1.51633 | 64.1 |
| 14 | 113.163 | DD[14] | | |
| 15 | 18.567 | 1.10 | 1.62588 | 35.7 |
| 16 | 12.570 | 4.81 | 1.51633 | 64.1 |
| 17 | 28.285 | 19.14 | | |
| 18 | ∞ | 2.85 | 1.51633 | 64.1 |
| 19 | ∞ | 1.13 | | |

TABLE 2

| | Example 1 | |
|---|---|---|
| | INFINITY | 1 m |
| f | 47.08 | 45.83 |
| FNo. | 2.23 | 2.25 |
| 2ω(°) | 35.6 | 35.2 |
| DD[12] | 1.80 | 4.92 |
| DD[14] | 12.00 | 8.88 |

TABLE 3

| | Example 1 | |
|---|---|---|
| SURFACE NUMBER | 8 | 9 |
| KA | 1.0000000E+00 | 1.0000000E+00 |
| A3 | 0.0000000E+00 | 0.0000000E+00 |
| A4 | 1.0018696E-04 | 1.4496191E-04 |
| A5 | -5.5663003E-05 | -3.7215937E-05 |
| A6 | 6.3275550E-06 | 4.9660289E-06 |
| A7 | 6.0283190E-08 | -5.1399766E-07 |
| A8 | 1.9625870E-09 | 7.1803138E-08 |
| A9 | 5.7464703E-11 | 6.5035723E-09 |
| A10 | -6.9758746E-10 | -9.7760559E-10 |
| A11 | -1.3029547E-10 | -1.9853310E-10 |
| A12 | -5.6219027E-12 | -6.7587302E-12 |
| A13 | 8.6443682E-13 | 7.9862908E-13 |
| A14 | 2.6228308E-13 | 2.5919768E-13 |
| A15 | 3.9086871E-14 | 3.5953775E-14 |
| A16 | 1.5612770E-15 | 1.5862428E-15 |
| A17 | -3.4824547E-16 | -2.7103969E-16 |
| A18 | -8.3652102E-17 | -7.0618799E-17 |
| A19 | -7.9965283E-18 | -6.0639996E-18 |
| A20 | 1.3619457E-18 | 1.0069047E-18 |

Figure 5:
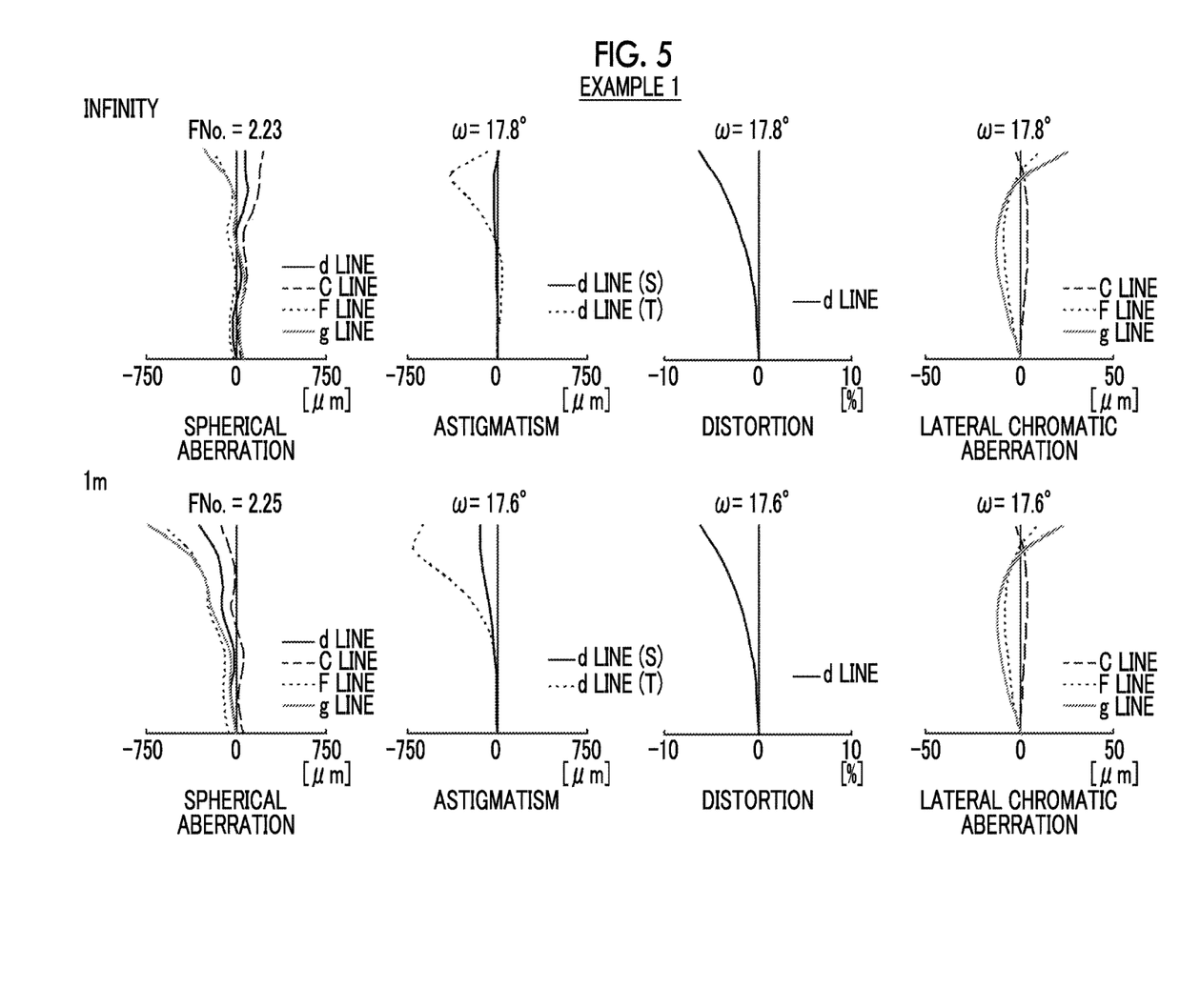
FIG. 5 is a diagram of aberrations of the imaging lens of Example 1 of the present invention.

FIG. 5 shows a diagram of aberrations of the imaging lens of Example 1. In the diagram of aberrations, the upper side labeled as "infinity" shows aberration diagrams in a state where the object at infinity is in focus, and the lower side labeled as "1 m" shows aberration diagrams in a state where an object at an object distance of 1 m is in focus. Further, in order from the left side of each diagram of aberrations, spherical aberration, astigmatism, distortion, and lateral chromatic aberration (chromatic aberration of magnification) are shown. In the spherical aberration diagram, aberrations at the d line (a wavelength of 587.56 nm), the C line (a wavelength of 656.27 nm), the F line (a wavelength of 486.13 nm), and the g line (a wavelength of 435.84 nm) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

EXAMPLE 2

Figure 2:
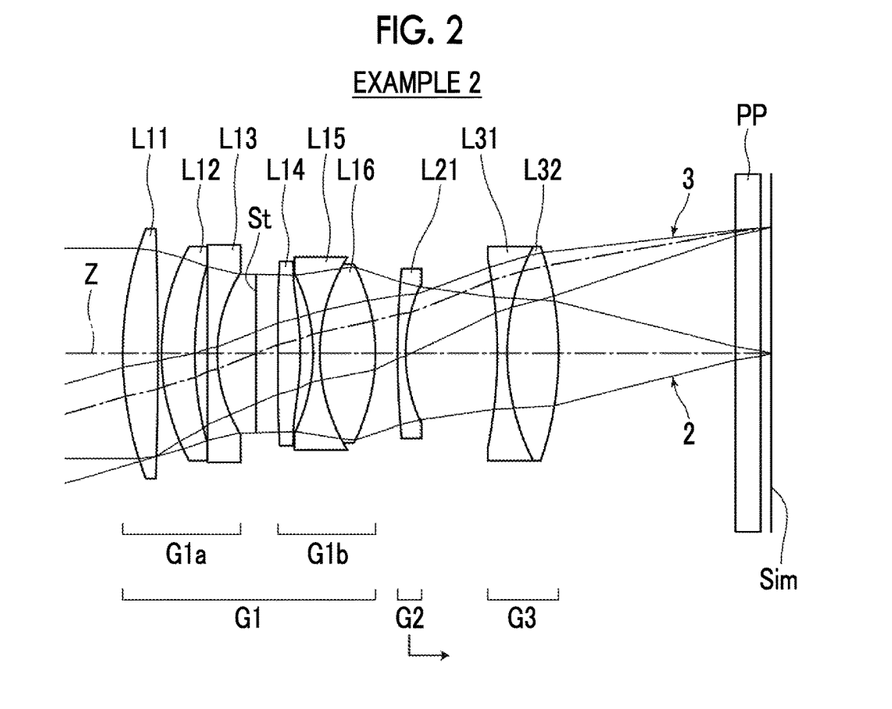
FIG. 2 is a cross-sectional view illustrating a configuration and an optical path of an imaging lens of Example 2 of the present invention.
Figure 6:
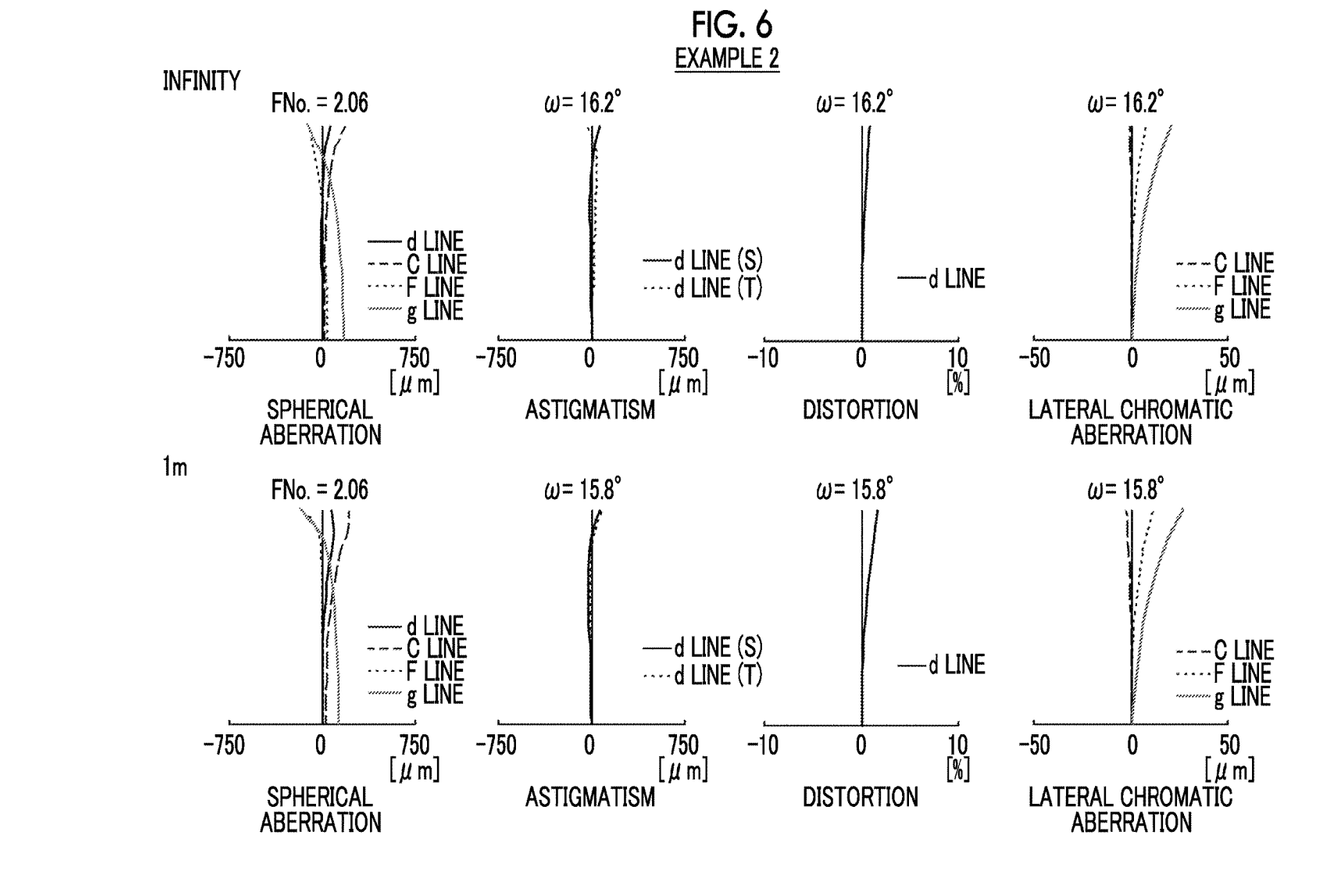
FIG. 6 is a diagram of aberrations of the imaging lens of Example 2 of the present invention.

FIG. 2 shows a lens configuration of the imaging lens of Example 2. A group configuration of an imaging lens of Example 2, the lens groups moving during focusing, a direction of movement of the lens groups, and the number of lenses constituting each lens group are the same as those of Example 1. Table 4 shows basic lens data of the imaging lens of Example 2, Table 5 shows specification and variable surface spacings, Table 6 shows aspheric coefficients, and FIG. 6 shows aberration diagrams.

TABLE 4

| | Example 2 | | | |
|---|---|---|---|---|
| Si | Ri | Di | Ndj | vdj |
| 1 | 38.462 | 4.00 | 1.74400 | 44.8 |
| 2 | -401.938 | 0.40 | | |
| 3 | 24.675 | 3.75 | 1.74400 | 44.8 |
| 4 | 36.318 | 1.43 | | |
| 5 | -2851164.750 | 1.05 | 1.63980 | 34.5 |
| 6 | 16.989 | 4.39 | | |
| 7(St) | ∞ | 2.49 | | |
| *8 | ∞ | 2.50 | 1.49710 | 81.6 |
| *9 | -31.467 | 1.44 | | |
| 10 | -20.256 | 0.76 | 1.68893 | 31.1 |
| 11 | 20.256 | 6.30 | 1.88300 | 39.2 |
| 12 | -21.575 | DD[12] | | |
| 13 | 101.467 | 0.90 | 1.51742 | 52.4 |
| 14 | 18.492 | DD[14] | | |
| 15 | -51.599 | 1.11 | 1.54072 | 47.2 |
| 16 | 26.074 | 5.80 | 1.72916 | 54.7 |
| 17 | -36.427 | 20.00 | | |
| 18 | ∞ | 2.85 | 1.51742 | 52.4 |
| 19 | ∞ | 1.11 | | |

TABLE 5

| | Example 2 | |
|---|---|---|
| | INFINITY | 1 m |
| f | 48.50 | 47.59 |
| FNo. | 2.06 | 2.06 |
| 2ω(°) | 32.4 | 31.6 |
| DD[12] | 2.50 | 4.21 |
| DD[14] | 10.24 | 8.53 |

TABLE 6

| | Example 2 | |
|---|---|---|
| SURFACE NUMBER | 8 | 9 |
| KA | 1.0000000E+00 | 1.0000000E+00 |
| A3 | 0.0000000E+00 | 0.0000000E+00 |
| A4 | 4.3707006E-05 | 8.9423218E-05 |
| A5 | -3.2969457E-05 | -3.4636238E-05 |
| A6 | 9.2709760E-06 | 1.0640833E-05 |
| A7 | -8.8165438E-07 | -1.3156012E-06 |
| A8 | -5.2095182E-08 | 1.2873148E-09 |
| A9 | 8.3173818E-09 | 1.0885268E-08 |
| A10 | 9.9225471E-10 | 4.4475421E-10 |
| A11 | -2.9447457E-13 | -6.2069306E-11 |
| A12 | -1.2759594E-11 | -1.0918216E-11 |
| A13 | -1.1892807E-12 | -3.1518599E-13 |
| A14 | -4.2710521E-14 | 3.8125232E-14 |
| A15 | 1.4797878E-14 | 1.3297291E-14 |
| A16 | 2.0250791E-15 | 2.4707931E-16 |
| A17 | 8.7049377E-17 | 2.3636168E-17 |
| A18 | -1.4340354E-17 | -1.0778452E-17 |
| A19 | -3.9022476E-18 | -1.1037857E-18 |
| A20 | 2.8086059E-19 | 1.0612794E-19 |

EXAMPLE 3

Figure 3:
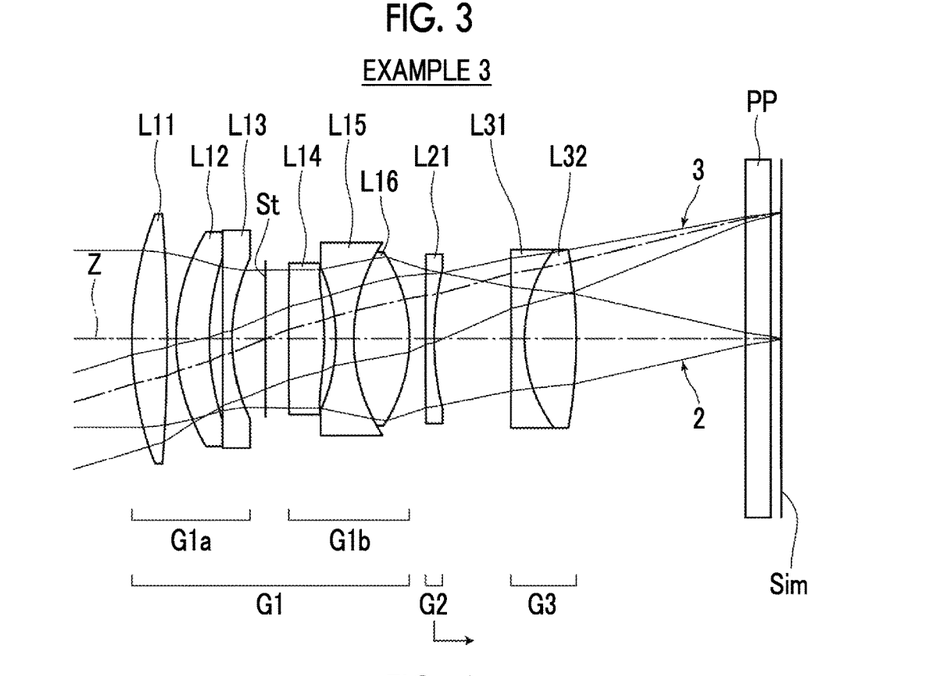
FIG. 3 is a cross-sectional view illustrating a configuration and an optical path of an imaging lens of Example 3 of the present invention.
Figure 7:
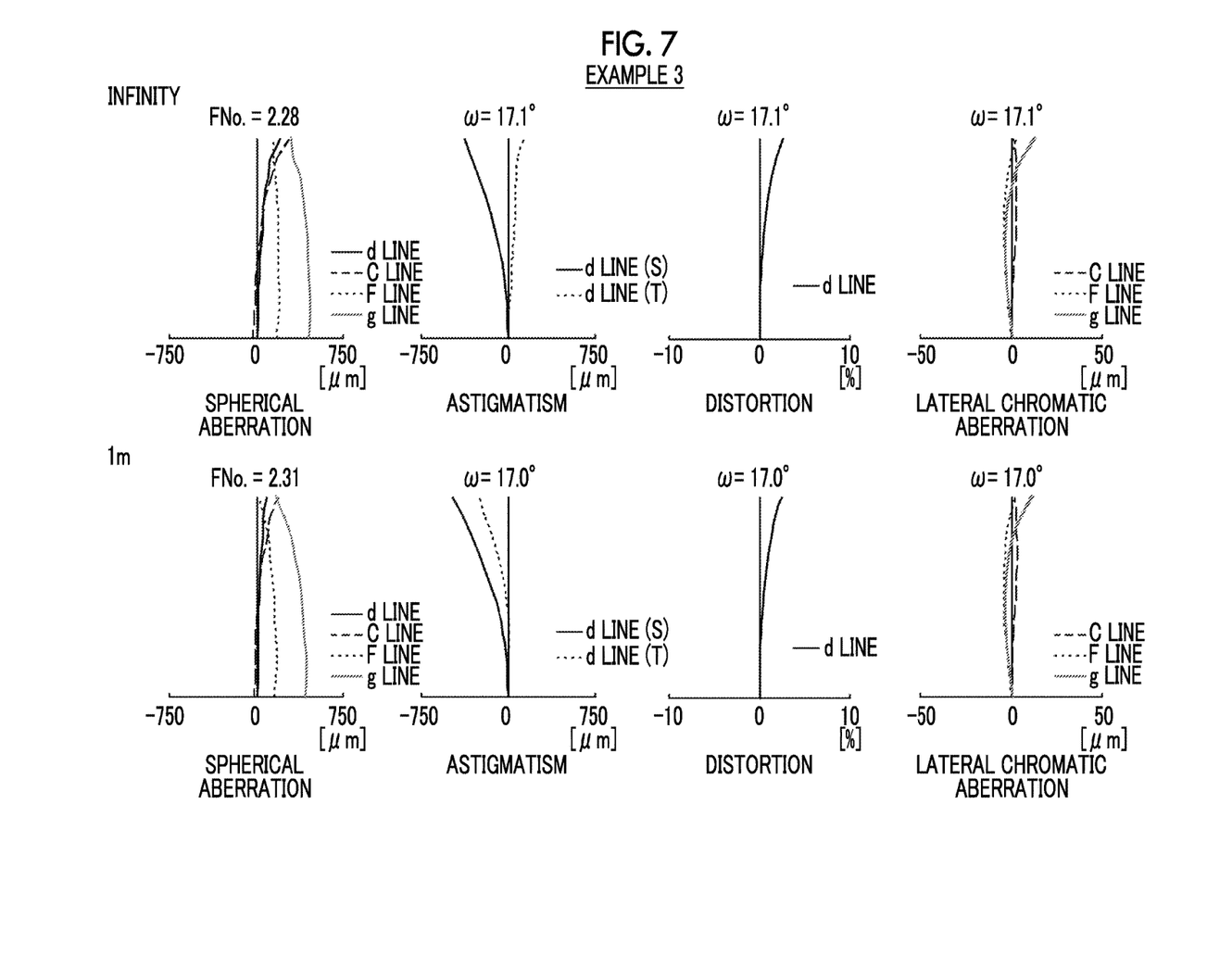
FIG. 7 is a diagram of aberrations of the imaging lens of Example 3 of the present invention.

FIG. 3 shows a lens configuration of the imaging lens of Example 3. The imaging lens of Example 3 is different from that of Example 1 in that the front group G1a has a negative refractive power. However, the other group configuration, the lens group moving during focusing and a direction of movement of the lens group, and the number of lenses constituting each lens group are the same as those of Example 1. Table 7 shows basic lens data of the imaging lens of Example 3, Table 8 shows specification and variable surface spacings, Table 9 shows aspheric coefficients, and FIG. 7 shows aberration diagrams.

TABLE 7

Example 3

| Si | Ri | Di | Ndj | vdj |
|---|---|---|---|---|
| 1 | 38.462 | 4.00 | 1.62588 | 35.7 |
| 2 | −182.661 | 1.00 | | |
| 3 | 23.063 | 3.75 | 1.67270 | 32.1 |
| 4 | 28.918 | 1.50 | | |
| 5 | −322749549.102 | 1.05 | 1.80518 | 25.4 |
| 6 | 21.852 | 3.74 | | |
| 7(St) | ∞ | 2.62 | | |
| *8 | ∞ | 4.00 | 1.49710 | 81.6 |
| *9 | −29.291 | 1.31 | | |
| 10 | −19.500 | 2.01 | 1.71736 | 29.5 |
| 11 | 19.500 | 6.30 | 1.88300 | 40.8 |
| 12 | −17.738 | DD[12] | | |
| 13 | 849.782 | 0.90 | 1.51633 | 64.1 |
| 14 | 32.847 | DD[14] | | |
| 15 | −1045.527 | 1.50 | 1.65100 | 56.2 |
| 16 | 16.688 | 5.82 | 1.57099 | 50.8 |
| 17 | −56.915 | 19.14 | | |
| 18 | ∞ | 2.85 | 1.51742 | 52.4 |
| 19 | ∞ | 1.05 | | |

TABLE 8

Example 3

| | INFINITY | 1 m |
|---|---|---|
| f | 45.14 | 43.81 |
| FNo. | 2.28 | 2.31 |
| 2ω(°) | 34.2 | 34.0 |
| DD[12] | 1.80 | 3.55 |
| DD[14] | 8.65 | 6.90 |

TABLE 9

Example 3

| SURFACE NUMBER | 8 | 9 |
|---|---|---|
| KA | 1.0000000E+00 | 1.0000000E+00 |
| A3 | 0.0000000E+00 | 0.0000000E+00 |
| A4 | 6.7169851E−06 | 1.1952991E−04 |
| A5 | −5.4995424E−06 | −1.9260512E−05 |
| A6 | 2.8902055E−06 | 7.5697161E−06 |
| A7 | −6.8309457E−07 | −1.2354884E−06 |
| A8 | 3.3022150E−08 | 5.2050562E−08 |
| A9 | 1.1315671E−08 | 1.3059173E−08 |
| A10 | 6.4881298E−11 | 2.7059486E−11 |
| A11 | −1.3845747E−10 | −1.5258249E−10 |
| A12 | −2.2009918E−11 | −2.5270746E−11 |
| A13 | −3.6599090E−13 | 9.8105090E−13 |
| A14 | 1.9083384E−13 | 2.4844166E−13 |
| A15 | 4.2586360E−14 | 3.9731292E−14 |
| A16 | 3.7104275E−15 | −1.2082214E−15 |
| A17 | −9.1966616E−17 | −7.5385738E−17 |
| A18 | −7.5111858E−17 | −6.5674508E−17 |
| A19 | −1.4373315E−17 | −2.7153187E−18 |
| A20 | 1.6329594E−18 | 7.1031904E−19 |

EXAMPLE 4

Figure 4:
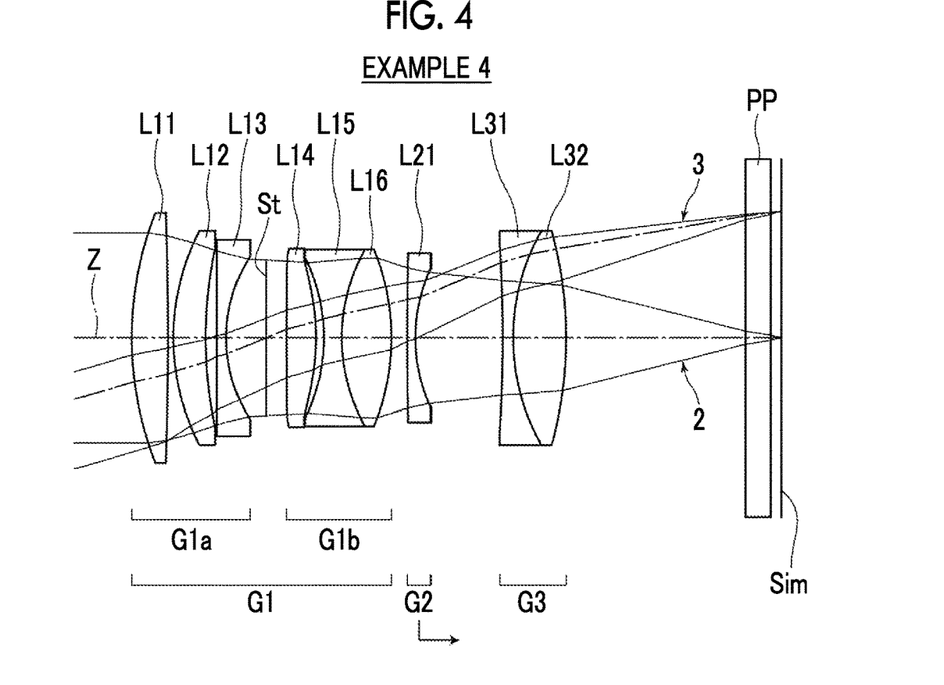
FIG. 4 is a cross-sectional view illustrating a configuration and an optical path of an imaging lens of Example 4 of the present invention.
Figure 8:
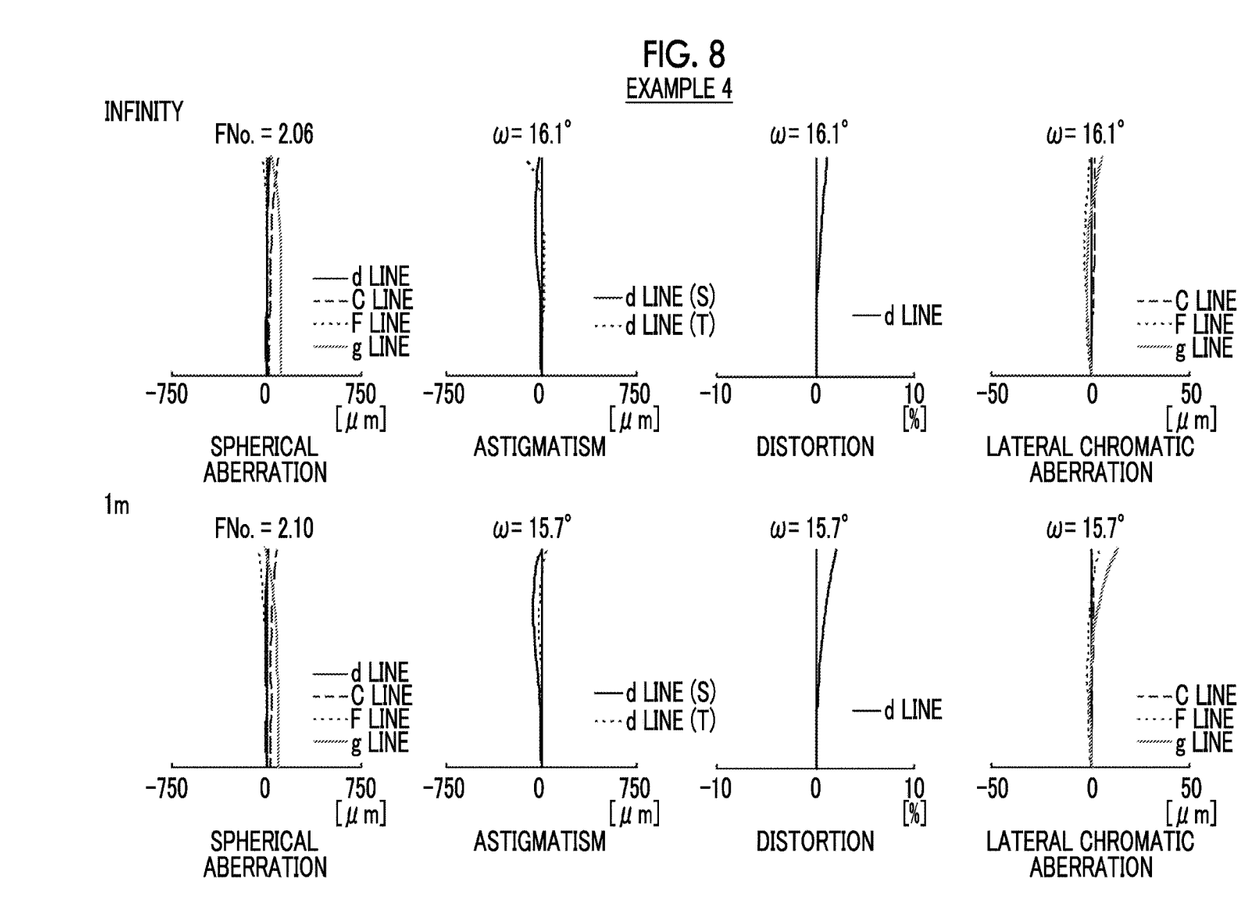
FIG. 8 is a diagram of aberrations of the imaging lens of Example 4 of the present invention.

FIG. 4 shows a lens configuration of the imaging lens of Example 4. A group configuration of an imaging lens of Example 4, the lens groups moving during focusing, the direction of movement of the lens groups, and the number of lenses constituting each lens group are the same as those of Example 1. Table 10 shows basic lens data of the imaging lens of Example 4, Table 11 shows specification and variable surface spacings, Table 12 shows aspheric coefficients, and FIG. 8 shows aberration diagrams.

TABLE 10

Example 4

| Si | Ri | Di | Ndj | vdj |
|---|---|---|---|---|
| 1 | 37.768 | 4.10 | 1.74400 | 44.9 |
| 2 | −413.561 | 0.61 | | |
| 3 | 25.981 | 3.64 | 1.74400 | 44.9 |
| 4 | 47.487 | 1.25 | | |
| 5 | ∞ | 1.05 | 1.63980 | 34.5 |
| 6 | 16.956 | 4.48 | | |
| 7(St) | ∞ | 2.31 | | |
| *8 | 927.947 | 3.31 | 1.49710 | 81.6 |
| *9 | −26.222 | 0.90 | | |
| 10 | −20.050 | 2.01 | 1.68893 | 31.2 |
| 11 | 20.050 | 5.62 | 1.88300 | 39.2 |
| 12 | −25.848 | DD[12] | | |
| 13 | 715.279 | 0.90 | 1.48749 | 70.2 |
| 14 | 18.627 | DD[14] | | |
| 15 | −164.932 | 1.18 | 1.54072 | 47.2 |
| 16 | 24.218 | 5.97 | 1.72916 | 54.7 |
| 17 | −44.857 | 20.28 | | |
| 18 | ∞ | 2.85 | 1.51742 | 52.4 |
| 19 | ∞ | 1.10 | | |

TABLE 11

Example 4

| | INFINITY | 1 m |
|---|---|---|
| f | 48.52 | 47.79 |
| FNo. | 2.06 | 2.10 |
| 2ω(°) | 32.2 | 31.4 |
| DD[12] | 1.80 | 3.51 |
| DD[14] | 9.73 | 8.02 |

TABLE 12

Example 4

| SURFACE NUMBER | 8 | 9 |
|---|---|---|
| KA | 1.0000000E+00 | 1.0000000E+00 |
| A3 | 0.0000000E+00 | 0.0000000E+00 |
| A4 | 3.8301909E−05 | 6.0101264E−05 |

TABLE 12-continued

Example 4

| SURFACE NUMBER | 8 | 9 |
|---|---|---|
| A5 | −3.6448618E−05 | −3.5495717E−05 |
| A6 | 1.0493217E−05 | 1.1205354E−05 |
| A7 | −1.0237599E−06 | −1.4431655E−06 |
| A8 | −6.0224440E−08 | 1.6798482E−09 |
| A9 | 9.1608206E−09 | 1.1491915E−08 |
| A10 | 1.1092113E−09 | 4.6018690E−10 |
| A11 | 4.8097099E−12 | −6.2653422E−11 |
| A12 | −1.3618641E−11 | −1.1066471E−11 |
| A13 | −1.2798017E−12 | −2.7818743E−13 |
| A14 | −5.1088995E−14 | 3.6535628E−14 |
| A15 | 1.5255626E−14 | 1.3125767E−14 |
| A16 | 2.1919837E−15 | 2.0008474E−16 |
| A17 | 9.4267473E−17 | 1.3360421E−17 |
| A18 | −1.5217809E−17 | −8.9014757E−18 |
| A19 | −4.1178124E−18 | −1.0615509E−18 |
| A20 | 2.9826588E−19 | 9.9600882E−20 |

Table 13 shows the corresponding values of Conditional Expressions (1) to (7) of the imaging lenses of Examples 1 to 4 and the focal length of each lens group. In Table 13, f1 is the focal length of the first lens group G1, and f1a is the focal length of the front group G1a. The values shown in Table 13 are based on the d line.

TABLE 13

| Expression Number | | Example 1 | Example 2 | Example 3 | Example 4 |
|---|---|---|---|---|---|
| (1) | f/f2 | 0.53 | 1.11 | 0.68 | 1.24 |
| (2) | $|(1-\beta2^2) \times \beta3^2|$ | 0.74 | 1.40 | 1.19 | 1.41 |
| (3) | vG1bp−vG1bn | 7.25 | 8.16 | 11.24 | 8.07 |
| (4) | vG2 | 64.10 | 52.40 | 64.10 | 70.20 |
| (5) | f/f1b | 1.48 | 1.62 | 1.85 | 1.45 |
| (6) | f/f3 | 0.41 | 0.83 | 0.22 | 1.00 |
| (7) | vG3p−vG3n | 28.44 | 7.45 | −5.36 | 7.45 |
| | f | 47.08 | 48.50 | 45.14 | 48.52 |
| | f1 | 42.47 | 36.25 | 31.73 | 37.61 |
| | f2 | −89.52 | −43.87 | −66.20 | −39.25 |
| | f3 | 113.46 | 58.19 | 207.49 | 48.63 |
| | f1a | 6825.96 | 299.55 | −918.69 | 166.10 |
| | f1b | 31.77 | 29.93 | 24.38 | 33.35 |

As can be seen from the above data, the imaging lenses of Examples 1 to 4 each have a small F number of 2.3 or less, have nine lenses which are the minimum number of lenses for constituting the entire system, and have a small size. Since the focus lens group is formed of one lens, the imaging lenses are able to perform high-speed focusing, aberration fluctuation thereof caused by the object distance is small, and each aberration is satisfactorily corrected throughout the entire object distance. Thereby, it is possible to achieve high optical performance.

Figure 9A:
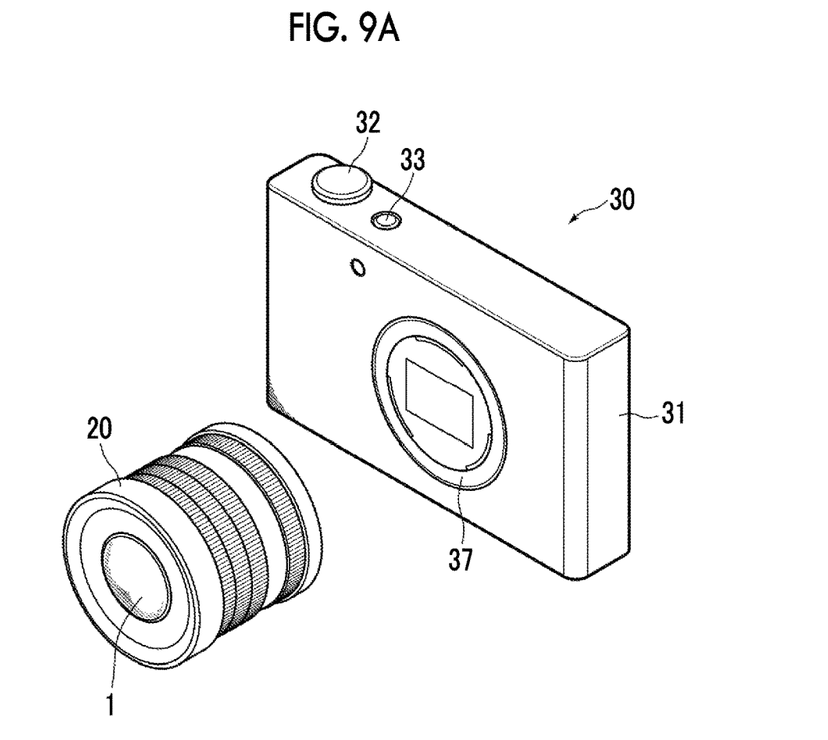
FIG. 9A is a perspective view of the front side of an imaging apparatus according to an embodiment of the present invention.
Figure 9B:
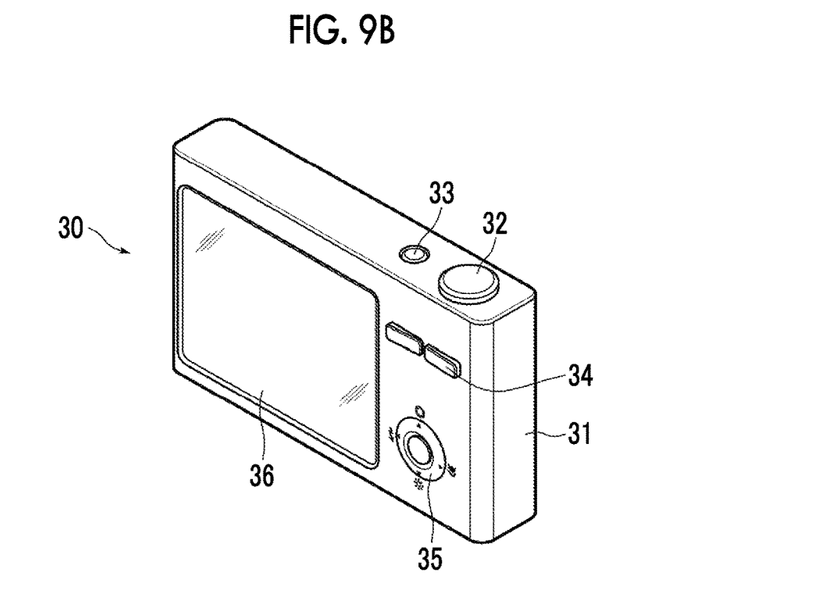
FIG. 9B is a perspective view of the rear side of an imaging apparatus according to the embodiment of the present invention.

Next, an imaging apparatus according to embodiment of the present invention will be described. FIGS. 9A and 9B are external views of a camera 30 which is the imaging apparatus according to the embodiment of the present invention. FIG. 9A is a perspective view of the camera 30 viewed from the front side, and FIG. 9B is a perspective view of the camera 30 viewed from the rear side. The camera 30 is a single-lens digital camera on which an interchangeable lens 20 is detachably mounted and which has no reflex finder. The interchangeable lens 20 is configured such that the imaging lens 1 according to the embodiment of the present invention is housed in a barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric surface coefficient of each lens are not limited to the values shown in the numerical examples, and different values may be used therefor.

Further, the imaging apparatus of the present invention is also not limited to the above-mentioned configurations. For example, the present invention may be applied to a single-lens reflex camera, a film camera, a video camera, and the like.

What is claimed is:

1. An imaging lens consisting of, in order from an object side:
   a first lens group that has a positive refractive power;
   a second lens group that has a negative refractive power; and
   a third lens group that has a positive refractive power,
   wherein the first lens group has a positive lens, a positive lens, and a negative lens, successively in order from a position closest to the object side,
   wherein the second lens group consists of one negative lens,
   wherein the number of lenses of the third lens group is equal to or less than two,
   wherein during focusing, only the second lens group moves in the optical axis direction, and
   wherein Conditional Expression (1) is satisfied, $$0.4<|f/f2|<1.3 \qquad (1),$$

where f is a focal length of the whole system in a state where an object at infinity is in focus, and
   f2 is a focal length of the second lens group.

2. The imaging lens according to claim 1, wherein the first lens group consists of, in order from the object side, a front group having a positive or negative refractive power, an aperture stop, and a rear group having a positive refractive power.

3. The imaging lens according to claim 1, wherein Conditional Expression (2) is satisfied, $$0.4<|(1-\beta2^2)\times\beta3^2|<1.8 \qquad (2),$$

where β2 is a paraxial lateral magnification of the second lens group in a state where the object at infinity is in focus, and β3 is a paraxial lateral magnification of the third lens group in a state where the object at infinity is in focus.

4. The imaging lens according to claim 2, wherein the rear group has at least one negative lens.

5. The imaging lens according to claim 2, wherein the rear group has a cemented lens formed by one negative lens and one positive lens that are cemented together.

6. The imaging lens according to claim 5, wherein the cemented lens closest to an image side in the rear group satisfies Conditional Expression (3), $$5 < vG1bp - vG1bn < 70 \quad (3),$$

where vG1bp is an Abbe number of a positive lens of the cemented lens closest to the image side in the rear group at a d line, and vG1bn is an Abbe number of a negative lens of the cemented lens closest to the image side in the rear group at the d line.

7. The imaging lens according to claim 1, wherein Conditional Expression (4) is satisfied, $$50 < vG2 < 75 \quad (4),$$

where vG2 is an Abbe number of the negative lens of the second lens group at the d line.

8. The imaging lens according to claim 1, wherein an image side surface of the second lens from the object side of the first lens group is a concave surface.

9. The imaging lens according to claim 2, wherein a surface closest to the image side in the front group is a concave surface.

10. The imaging lens according to claim 5, wherein a surface closest to the object side in the cemented lens closest to the image side within the rear group is a concave surface.

11. The imaging lens according to claim 2, wherein Conditional Expression (5) is satisfied, $$1 < f/f1b < 2 \quad (5),$$

where f1b is a focal length of the rear group.

12. The imaging lens according to claim 1, wherein an image side surface of the negative lens of the second lens group is a concave surface.

13. The imaging lens according to claim 1, wherein Conditional Expression (6) is satisfied, $$0.1 < f/f3 < 2 \quad (6),$$

where f3 is a focal length of the third lens group.

14. The imaging lens according to claim 1, wherein the third lens group consists of a cemented lens formed by one negative lens and one positive lens that are cemented together in order from the object side.

15. The imaging lens according to claim 14, wherein Conditional Expression (7) is satisfied, $$-10 < vG3p - vG3n < 50 \quad (7),$$

where vG3p is an Abbe number of the positive lens of the cemented lens of the third lens group at the d line, and vG3n is an Abbe number of the negative lens of the cemented lens of the third lens group at the d line.

16. The imaging lens according to claim 1, wherein a surface closest to the image side in the third lens group is a convex surface.

17. The imaging lens according to claim 1, wherein Conditional Expression (1-1) is satisfied.

$$0.5 < f/f2 | < 1.25 \quad (1-1)$$

18. The imaging lens according to claim 3, wherein Conditional Expression (2-1) is satisfied.

$$0.7 < |(1-\beta2^2) \times \beta3^2| < 1.5 \quad (2-1)$$

19. The imaging lens according to claim 11, wherein Conditional Expression (5-1) is satisfied.

$$1.4 < f/f1b < 1.9 \quad (5-1)$$

20. An imaging apparatus comprising the imaging lens according to claim 1.

* * * * *